United States Patent [19]

Martin

[11] 4,201,243

[45] May 6, 1980

[54] CHECK VALVES

[75] Inventor: Benjamin Martin, Kirkburton, England

[73] Assignee: The Drum Engineering Company Limited, Bradford, England

[21] Appl. No.: 969,704

[22] Filed: Dec. 15, 1978

[51] Int. Cl.² ............................................. F16K 31/12
[52] U.S. Cl. ................................. 137/510; 137/512.3; 137/519
[58] Field of Search ...................... 137/510, 519, 512.3

[56] References Cited

U.S. PATENT DOCUMENTS

| 697,702 | 4/1902 | Buckley | 137/510 |
|---|---|---|---|
| 1,236,056 | 8/1917 | Coleman | 137/519 |
| 3,140,726 | 7/1964 | Arenhold | 137/510 X |

Primary Examiner—Harold W. Weakley
Attorney, Agent, or Firm—Fred Philpitt

[57] ABSTRACT

A check valve for connection between a source of pressure medium and a pressure medium reservoir to allow passage of pressure medium from the source to the reservoir but to prevent reverse flow from the reservoir to the source.

In order reliably to prevent reverse flow through the valve when the back pressure on the valve is low, the check valve comprises first (31,32) and second (46,50)individual pressure responsive valves in series in a common housing (10), both valves permitting forward flow of pressure medium but, in conditions of zero forward flow, one (46,50) of said valves being firmly closed in response to high back pressures from the reservoir and the other valve (31,32) being firmly closed at low back pressures from the reservoir.

8 Claims, 1 Drawing Figure

U.S. Patent      May 6, 1980      4,201,243
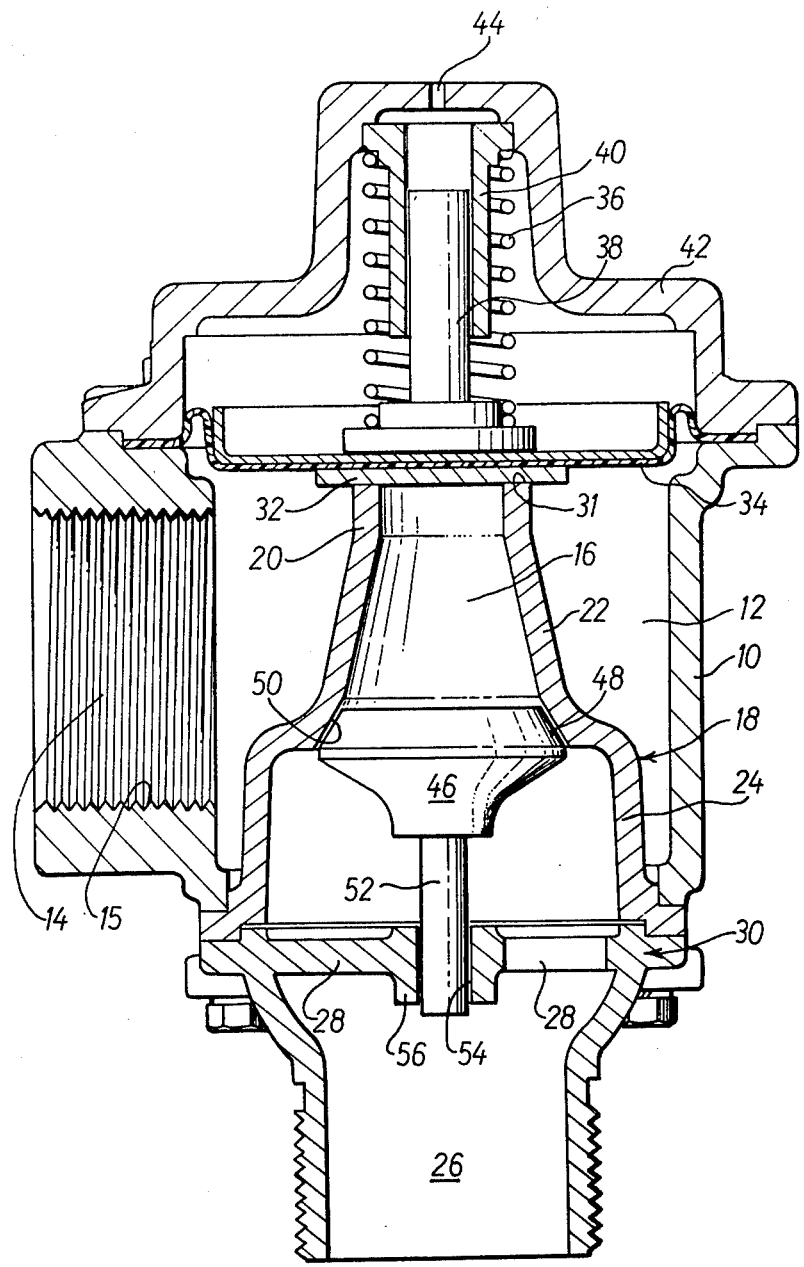

CHECK VALVES

DESCRIPTION

The present invention relates to check valves for connection between a source of pressure medium and a pressure medium reservoir to allow passage of pressure medium from said source to the reservoir but to prevent reverse flow from the reservoir to the source.

It is an objective of the present invention to provide a check valve which is effective to prevent reverse flow through the valve not only at high back pressures but also when the back pressure is low.

In accordance with the present invention there is provided a check valve for connection between a source of pressure medium and a pressure medium reservoir to allow passage of pressure medium from said source to the reservoir but to prevent reverse flow from the reservoir to the source, the check valve comprising first and second individual pressure responsive valves in series in a common housing, both valves permitting forward flow of pressure medium but, in conditions of zero forward flow, one of said valves being firmly closed in response to high back pressures from the reservoir and the other valve being firmly closed at low back pressures from the reservoir.

In a preferred embodiment of the invention, the upstream valve, considered in the direction of forward flow, comprises a diaphragm operated closure member which is arranged to be displaced from a first fixed valve seat to an open position by virtue of the forward pressure exerted by the pressure medium on said diaphragm against an opposing spring biassing force but which is fully closed against said first valve seat by said spring biassing force at low back pressures and zero forward flow, and the downstream valve comprises a substantially freely displaceable closure member which is arranged to adopt a position spaced from a second fixed valve seat during forward flow by virtue of the forward pressure of said pressure medium but which is arranged to be brought into sealing engagement with the second valve seat at high back pressures and zero forward flow by virtue of a reverse pressure difference developed thereacross.

Advantageously, the closure member of said downstream valve is adapted to fall to said open position spaced from the second fixed valve seat under gravity and is otherwise unbiassed.

Normally, the source of pressure medium would be an air compressor and the reservoir a storage tank.

The aforegoing check valve is particularly advantageous for use in connection with the road tank truck pressure discharge of liquids, especially liquids of an agressive nature, since it allows the internal surfaces of the discharge compressor to be protected from contamination, corrosion and reverse rotation which might otherwise result from back pressure return along compressed air delivery pipework at pressures between 0 Kg/cm$^2$ and approximately 3 Kg/cm$^2$.

The invention is described further hereinafter, by way of example, with reference to the accompanying drawing which is a vertical section through one embodiment of a check valve constructed in accordance with the invention.

The illustrated valve comprises an outer housing 10 defining an inlet chamber 12 for connection, when the valve is in use, to the outlet of a compressor (not shown). For this purpose, the housing 10 includes an inlet port 14 having a female thread 15 for receiving an outlet pipe from the compressor. Located within the chamber 12 is a further chamber 16 of generally frusto-conical configuration which is defined by a tubular member 18 disposed transversely to the inlet port 14. The tubular member 18 comprises a first portion 20 of cylindrical configuration, an intermediate portion 22 of frusto-conical configuration, and a third portion 24 again of cylindrical configuration. The wider, third portion 24 of the tubular member 18 communicates without restriction with a male threaded outlet port 26 via the spaces between radial ribs 28 in a circular disc or spider 30, mentioned further below. In use, the outlet port 26 is connected to the inlet of a pressure (not shown).

The annular free end surface 31 of the smaller, cylindrical portion 20 of the tubular member 18 forms a valve seat which is engageable by a flat sealing member 32 carried on one side of a composite diaphragm 34 which defines one end of the inlet chamber 12. The diaphragm 34 is biassed by means of a helical coil spring 36 such that the sealing member 32 normally engages the annular valve seat 31, the spring 36 being supported by means of a pin member 38 which is slidably received in a cylindrical guide 40. The spring 36 and guide arrangement 38, 40 are contained in a subsidiary housing part 42 but continuous communication with the atmosphere of the side of the diaphragm 34 which is remote from the tubular member 18 is achieved by the provision of a bore 44.

Disposed within the tubular member 18 is a sealing plug 46 having an upper spherically radiused tapered sealing surface 48 which is adapted to be engageable under certain conditions with a valve seat portion 50 at the lower end of the frusto-conical portion 22 of the tubular member 18. The plug 46 carries a downwardly extending pin 52 which is slidably received in a bore 54 in a central boss portion 56 of the disc 30 so as to serve as an axial guide for the plug 46. It will be appreciated that, since there is no permanent biassing means provided for the plug 46, when the valve is not in use the plug would normally drop under gravity from its illustrated position to engage the disc 30.

The above-described valve operates as follows.

The valve is normally mounted in a vertical attitude on the delivery side of the compressor, preferably not more than 1 m. distant in any attitude, the female thread 16 (conveniently 2" BSP) being coupled to the pipe from the compressor and the pipe or hose to the pressure tank being coupled to the male thread (also conveniently 2" BSP) on the output port 26. When air flow from the compressor commences, a pressure is developed on the annular area C of the diaphragm 34 which causes the diaphragm to lift, against the compression spring 36, away from the annular valve seat 31. This allows air flow through the chamber 16, past the tapered plug 46, which is in its lower position remote from the valve seat 50, and into the vehicle pressure tank via the outlet port 26.

Two basic conditions are encountered when the compressor is stopped and these will be considered separately.

The first condition occurs when the check valve has to seal against full pressure in the pressure tank, for example when the latter pressure is in the range 0.4 to 3.0 Kg/cm$^2$. In these circumstances, when the compressor is stopped, air flow ceases in the forward direction and reversal of flow commences. The pressure difference then occurring across the tapered plug 46 causes it to be raised so as to firmly engage the valve seat 50 where it then firmly seals against the tank pressure. Furthermore, the removal of the pressure applied to the full area of the main diaphragm 34 allows it to return under the action of the spring 36 so that the sealing member 32 firmly engages the annular valve seat 31 on the end of the tubular member 18. Thus, under these conditions, the tapered plug acts as a high pressure seal and, in conjunction with the diaphragm 34 provides an air-tight seal.

The second condition occurs when the check valve has to seal against a low pressure in the pressure tank, for example less than 0.4 Kg/cm$^2$. In these circumstances, the same effects occur except that the engagement of the tapered air plug 46 with the valve seat 50 is not entirely air-tight and indeed at atmospheric pressure will fall away from the seat 50 under gravity, when the valve is mounted in the vertical plane as illustrated. However, under these conditions, the pressure difference across the diaphragm acting across the area of the valve seat 31 is increasing to its maximum so that the seal between the closure member 32 and valve seat 31 improves, again being air-tight.

Preferably, the tubular member 18 and the outlet adapter 26 are constructed of stainless steel in view of the possible contact with potentially agressive vapours from the pressure tank. For similar reasons, the plug 46 is preferably made of glass filled P.T.F.E. and the diaphragm 34 of virgin P.T.F.E.

I claim:

1. A check valve for connection between a source pressure medium and a pressure medium reservoir to allow passage of pressure medium from said source to the reservoir but to prevent reverse flow from the reservoir to the source, the check valve comprising:
   (1) a housing defining a first chamber;
   (2) an inlet coupling on the housing for connection to the source of pressure medium; said inlet coupling being in direct communication with said first chamber;
   (3) an outlet coupling on the housing for connection to the reservoir;
   (4) first and second valve means disposed in series in the housing;
   (5) the upstream valve means, considered in the direction of forward flow from the inlet to outlet, including:
      (a) flow tube means disposed in said first chamber;
      (b) a first valve seat formed on one end of said flow tube means;
      (c) a diaphragm closing one end of said first chamber;
      (b) a first closure member carried by said diaphragm;
      (e) spring means biasing the diaphragm and first closure member so that the latter engages said first valve seat when the force on the diaphragm resulting from the pressure in said first chamber is less than the combined force on the diaphragm resulting from said spring biassing means and the pressure in said flow tube means downstream of the said first valve seat; and
   (6) the downstream valve means including:
      (f) a second valve seat formed internally of said flow tube means downstream of said one end; and
      (g) a second closure member disposed in said flow tube means downstream of said second valve seat such that it is held in a closed position in which it engages said second valve seat only when the pressure downstream of the second valve seat is higher than the pressure in said first chamber.

2. A check valve according to claim 1 in which said second closure member of the downstream valve is guided for free displacement in a vertical direction whereby it can fall under gravity to its open position spaced from the second fixed valve seat when the pressure downstream of the second valve seat is lower than the pressure in said first chamber.

3. A check valve according to claim 2 in which said outlet coupling comprises a cylindrical outlet port in the housing and in which said flow tube means comprises a tubular member disposed within the housing parallel to the axis of the outlet port, said first valve seat being formed by one end of said tubular member and the other end of said tubular member communicating directly with the outlet port.

4. A check valve according to claim 3 in which said inlet coupling comprises a cylindrical inlet port on said housing whose axis is perpendicular to the axes of said tubular member and said outlet port.

5. A check valve according to claim 4 in which the axes of said tubular member and said outlet port are concident.

6. A check valve according to claim 3 in which said tubular member includes a frusto-conical portion whose wider end forms said second valve seat for said freely displaceable closure member of the downstream valve.

7. A check valve according to claim 6 in which the freely displaceable closure member is constrained for axial movement parallel to the axis of said tubular member.

8. A check valve for connection between a source of pressure medium and a pressure medium reservoir to allow passage of pressure medium from said source to the reservoir but to prevent reverse flow from the reservoir to the source, the check valve comprising first and second individual pressure responsive valves in series in a common housing, both valves permitting forward flow of pressure medium but, in conditions of zero forward flow, one of said valves being firmly closed in response to high back pressures from the reservoir and the other valve being firmly closed at low back pressures from the reservoir, the upstream valve, considered in the direction of forward flow, comprising a diaphragm operated closure member which is displaced from a first fixed valve seat to an open position by virtue of the forward pressure exerted by the pressure medium on said diaphragm against an opposing spring biassing force but which is fully closed against said first valve seat by said spring biassing force at low back pressures and zero forward flow, and the downstream valve comprising a substantially freely displaceable closure member which adopts a position spaced from a second fixed valve seat during forward flow by virtue of the forward pressure of said pressure medium but which is arranged to be brought into sealing engagement with the second valve seat at high back pressure and zero forward flow by virtue of a reverse pressure difference developed thereacross.

* * * * *